US007766649B2

(12) United States Patent
Abbasi et al.

(10) Patent No.: US 7,766,649 B2
(45) Date of Patent: Aug. 3, 2010

(54) MULTI-PORTED, INTERNALLY RECUPERATED BURNERS FOR DIRECT FLAME IMPINGEMENT HEATING APPLICATIONS

(75) Inventors: Hamid A. Abbasi, Naperville, IL (US); Harry Kurek, Dyer, IN (US); Yaroslav Chudnovsky, Skokie, IL (US); Vladimir G. Lisienko, Ekaterinburg (RU); German K. Malikov, Ekaterinburg (RU)

(73) Assignee: Gas Technology Institute, Des Plaines, IL (US)

( * ) Notice: Subject to any disclaimer, the term of this patent is extended or adjusted under 35 U.S.C. 154(b) by 763 days.

(21) Appl. No.: 11/073,950

(22) Filed: Mar. 7, 2005

(65) Prior Publication Data

US 2006/0199119 A1 Sep. 7, 2006

(51) Int. Cl.
*F23C 9/08* (2006.01)
(52) U.S. Cl. .................. 431/116; 431/11; 431/215; 431/187
(58) Field of Classification Search .................. 431/181, 431/187, 215, 115, 116, 8, 9
See application file for complete search history.

(56) References Cited

U.S. PATENT DOCUMENTS

| | | | | |
|---|---|---|---|---|
| 3,695,816 A | * | 10/1972 | Oeppen et al. | 431/166 |
| 4,304,549 A | * | 12/1981 | Pfau | 431/215 |
| 4,309,165 A | * | 1/1982 | McElroy | 431/8 |
| 4,401,099 A | * | 8/1983 | Collier | 126/91 A |
| 4,681,085 A | * | 7/1987 | Clawson | 126/110 R |
| 5,344,310 A | * | 9/1994 | Harbeck et al. | 431/158 |
| 5,411,394 A | * | 5/1995 | Beer et al. | 431/9 |

FOREIGN PATENT DOCUMENTS

SU 852947 8/1981
SU 1097881 6/1984

OTHER PUBLICATIONS

Malikov, G.K. et al., "Direct Flame Impingement Heating for Rapid Thermal Materials Processing", *International Journal of Heat and Mass Transfer*, 44, 1751-1758 (2001).
Malikov, G.K. et al., "Experimental and Theoretical Study of High Velocity Multi-Flame Direct Flame Impingement Heating", American Flame Research Conference, Baltimore, MD, Sep. 30, 1996.
Lisienko, V.G et al., "Metallurgical Heat Engineering—Efficiency of Using Jet-Flame Heating in Industrial Furnaces", *Steel in Translation*, vol. 26, No. 6, pp. 70-74, 1996.
Malikov, G. K. et al., "Experimental and Numerical Study of Heat Transfer in a Flame Jet Impingement System", *Journal of the Institute of Energy*, 72, pp. 2-9, Mar. 1999.

* cited by examiner

*Primary Examiner*—Steven B McAllister
*Assistant Examiner*—Sarah Suereth
(74) *Attorney, Agent, or Firm*—Mark E. Fejer

(57) ABSTRACT

A direct flame impingement method and apparatus employing at least one multi-ported, internally recuperated burner. The burner includes an innermost coaxial conduit having a first fluid inlet end and a first fluid outlet end, an outermost coaxial conduit disposed around the innermost coaxial conduit and having a combustion products outlet end proximate the first fluid inlet end of the innermost coaxial conduit and a combustion products inlet end proximate the first fluid outlet end of the innermost coaxial conduit, and a coaxial intermediate conduit disposed between the innermost coaxial conduit and the outermost coaxial conduit, whereby a second fluid annular region is formed between the innermost coaxial conduit and the intermediate coaxial conduit and a combustion products annular region is formed between the intermediate coaxial conduit and the outermost coaxial conduit. The intermediate coaxial conduit has a second fluid inlet end proximate the first fluid inlet end of the innermost coaxial conduit and a second fluid outlet end proximate the combustion products inlet end of the outermost coaxial conduit.

4 Claims, 5 Drawing Sheets

MULTI-PORTED, INTERNALLY RECUPERATED BURNERS FOR DIRECT FLAME IMPINGEMENT HEATING APPLICATIONS

The U.S. Government has a paid-up license in this invention and the right under limited circumstances to require the patent owner to license others on reasonable terms as provided for by the terms of Contract No. DE-FC07-01ID14043 awarded by the U.S. Department of Energy.

BACKGROUND OF THE INVENTION

1. Field of the Invention

This invention relates to direct flame impingement heating applications. More particularly, this invention relates to a method and apparatus for heating ferrous and non-ferrous objects in which the flame resulting from combustion of a fuel/oxidant mixture is allowed to impinge directly upon the surface of the objects to be heated, by virtue of which the bulk temperature of the product is reached more efficiently, over a shorter period of time, with reduced scale loss and lower undesirable emissions than with conventional methods and apparatuses employed for heating such objects.

2. Description of Related Art

Many industrial processes require rapid heating of metals, which is typically accomplished by using gas-fired furnaces that are designed to increase radiation heat transfer or electric induction furnaces. For many applications, however, a more attractive alternative is to use gas-fired furnaces that are designed to increase convective heat transfer. In recent years, interest in applying the concept of direct flame impingement in industrial furnaces to enhance convective heat transfer rates has increased. In some applications, direct flame impingement is emerging as an attractive and cost-effective alternative to conventional radiant heating. Use of direct flame impingement offers several potential advantages over radiant heating, such as increased heat fluxes, which reduces processing time, fuel consumption and undesirable scale formation (oxidation), and which improves product quality. In addition, with multi-flame direct flame impingement, the heating can be locally targeted by adjusting the firing rate of the individual flames.

Applications for direct flame impingement include continuous heating of tubes and strips and reheating of billets and slabs. In conventional gas-fired furnaces used for these processes, the convective heat transfer coefficient is usually less than 50 W/m$^2$ K (9.0 Btu/ft$^2$h-F). With direct flame impingement, however, this coefficient can be increased to several times this value. During the past several years, a number of rapid heating technologies using different jet impingement approaches have been investigated. Primary differences between these approaches are in the type of jet used and their makeup. In one approach, high velocity combustion products are generated by special tunnel burners and little or no combustibles are present in the impingement zone. An alternative approach utilizes high velocity flames with intense fuel/oxidant mixing and burning in the impingement zone.

The use of rapid heating technologies based on impinging jets of hot combustion products has grown steadily over the past decade in the metallurgical industry. This is primarily due to the development of burners having high exit velocities. For many applications, a more effective alternative for rapid heating, however, might be to apply direct impingement of multiple flames. This approach involves installation of several steel nozzles, almost flush with the internal surfaces of the furnace walls, to direct high-velocity premixed fuel/air mixture flames at the product surface. No separate combustion chambers or tunnels or flame holders are used. To ensure very high heat transfer rates, velocities to Mach 1 are employed. Although the approach is simple, unlike conventional furnaces equipped with tunnel burners, the high velocity multi-flame direct flame impingement system requires more critical furnace design as well as accurate definitions of key parameters, including nozzle diameters and their spacing, distance between the nozzles and the metal product, and the firing rate per-unit area of the metal product surface. Improper specification of these parameters can result in unstable and incomplete combustion as well as reduced thermal efficiency.

SUMMARY OF THE INVENTION

Accordingly, it is one object of this invention to provide a more efficient direct flame impingement system compared to conventional direct flame impingement systems.

It is another object of this invention to provide a method for direct flame impingement which provides greater efficiency, reduced scale loss and lower emissions than conventional heating applications.

These and other objects of this invention are addressed by a direct flame impingement system comprising at least one specially designed multi-channel burner comprising a burner housing that preheats ambient combustion air using one or more channels within the burner housing using products of combustion produced between the burner outlet and the product being heated, and that mixes the fuel gas entering, from a separate channel, with the preheated air in a way which avoids flashback while producing substantial heat release at the surface of the product being heated. More particularly, the objects of this invention are addressed by an apparatus comprising at least one refractory wall enclosing a combustion chamber in which is disposed at least one ferrous and/or non-ferrous object to be heated. The refractory wall forms at least one burner opening adapted to receive a burner, in which burner opening is disposed a burner. The burner comprises a plurality of coaxial conduits, the innermost of said conduits, in accordance with one embodiment of this invention, having a fuel gas inlet end and a fuel gas outlet end, the outermost of said conduits having a combustion products inlet end proximate the fuel gas outlet end of the innermost conduit and a combustion products exhaust end proximate the fuel gas inlet end of the innermost conduit, and the intermediate of said conduits being disposed between the outermost conduit and the innermost conduit and having a combustion air inlet end proximate the fuel gas inlet end of the innermost conduit and a combustion air outlet end proximate the fuel gas outlet end innermost conduit, the innermost of said conduits and the intermediate conduit forming a combustion air annular region therebetween and the outermost conduit and the intermediate conduit forming a combustion products annular region therebetween. As used herein, the term "combustion air" is synonymous with the term "combustion oxidant" also used herein and is meant to include any oxidant, such as oxygen and oxygen-enriched air, and any gas or gaseous mixture containing oxygen, suitable for combustion of a fuel gas employed in the method and apparatus of this invention.

In use, in accordance with one particularly preferred embodiment of this invention, a fuel gas is introduced into the fuel gas inlet end of the innermost conduit of the at least one burner. Combustion oxidant is introduced into the oxidant inlet end of the intermediate conduit from which it passes through the oxidant annular region formed between the innermost conduit and the intermediate conduit. Having passed through the innermost conduit, the fuel gas is discharged from the innermost conduit through at least one fuel gas opening formed by the innermost conduit proximate the fuel gas outlet end of the innermost conduit, where it mixes with the oxidant from the oxidant annular region. The resulting mixture is ignited, forming a flame, which impinges on the surface of the ferrous and/or non-ferrous product being heated and which forms combustion products. At least a portion of the combustion products are drawn into the combustion products annular region disposed between the intermediate conduit and the outermost conduit, as a result of which heat in the combustion products is transferred through the intermediate conduit wall into the oxidant annular region, thereby preheating the combustion oxidant prior to it being mixed with the fuel gas. The cooler combustion products are then exhausted through the combustion products outlet end of the outermost conduit. It is to be understood that the fluids flowing through the innermost and intermediate conduits are interchangeable; that is, fuel may be introduced through the intermediate conduit and combustion oxidant may be introduced through the innermost conduit, and such embodiments are deemed to be within the scope of this invention.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
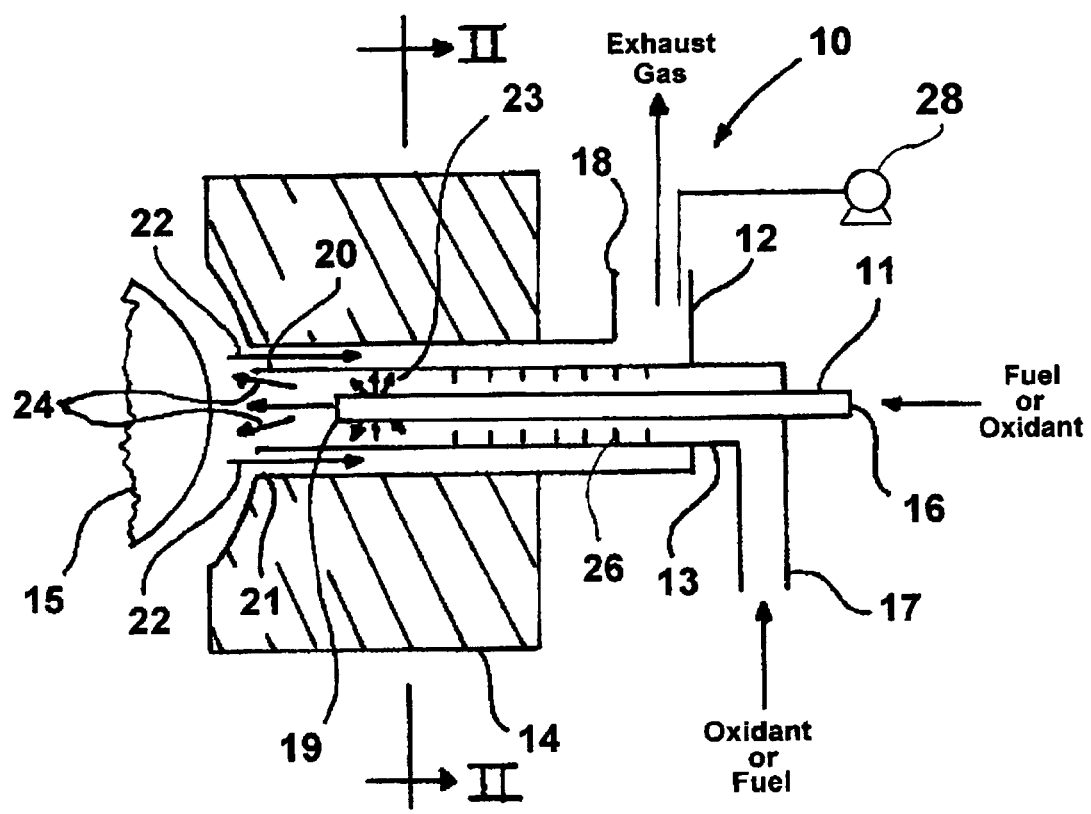
FIG. 1 is a schematic cross-sectional view of a single internally recuperated direct flame impingement burner in accordance with one embodiment of this invention.

Direct Flame Impingement (DFI) is a means for reheating ferrous and non-ferrous products for further processing. The typical product temperature range is about 2100° F. to about 2200° F. for round/square ferrous products, 1600° F. to about 1750° F. for ferrous strip products and 1000° F. to about 1500° F. for non-ferrous materials. In accordance with the invention disclosed herein, direct flame impingement of both combusted and partially combusted products of combustion using preheated combustion air and/or fuel onto the surface of the ferrous and non-ferrous products without negatively affecting product quality is accomplished by self-recuperated, high velocity, specially designed and placed burners. More particularly, the invention disclosed herein is a specially designed multi-channel burner that preheats ambient combustion air and/or fuel using a series of channels within the burner housing using products of combustion produced between the burner outlet and the product being heated, mixing the fuel gas entering, from a separate channel, with the combustion air in such a way that avoids flashback while producing substantial heat release at the surface of the product being heated. By directing the heat released from each multi-ported, internally recuperated burner to the surface of the product rather than to the surrounding refractory, a high degree of efficiency is achieved. The forced convection heat flux ranges from about 300 Btu/in$^2$/hr to about 1000 Btu/in$^2$/hr, depending upon, but not limited to, the bulk temperature of the product, specific thermal conductivity rate-change, and size of the product. The rate of heat penetration into the product can be controlled by a combination of firing methods including on/off, pulsing or oscillating zones of the internally-recuperated burner at a predetermined rate and time period by relying upon the changing, known variable thermal conductivity values of the products, varying the speed of the product through the furnace, and by imparting a rotation of the products (in the case of round products). By preheating the combustion air in accordance with one embodiment of this invention at each internally recuperated burner with local spent products of combustion, the temperature on the flame jet axis rises from a range of about 2000° F. for ambient air to about 3300° F. for preheated air, thereby ensuring high convective heat fluxes to the product. This enables the implementation of a very compact gas-fired furnace with the internal workspace only slightly larger than that for electric induction furnaces.

DFI systems, by employing the multi-ported, internally recuperated burner of this invention, can be applied to the reheating of a variety of shapes, for example, round or square product and flat or strip product, including coiled transfer bars. The shape or application determines the sizes of the DFI system burners, the number and spacing of the burners, the position of the burner outlets with respect to the surface of the product, the specific method of heat recuperation and the control scheme to operate the cycling of the burners from on to off and off to on. By employing these multi-channel, internally recuperated burners, noise levels can be significantly reduced and, additionally, some channels can be dedicated to combustion air and others to the fuel to avoid flashback conditions.

Proper design of the multi-channel burners, placement, density, number of burners, fuel and air speeds, temperature measurement and the appropriate firing control combine to provide a higher efficiency, lower emissions, non-oxidizing (to product) alternative to conventional heating that relies upon the products of combustion to heat the internal furnace refractory, which re-radiates to the product, and that relies upon flame radiation directly to the product resulting in higher emissions, expensive refractories, large chambers which increases first costs, and the resultant low to moderate efficiencies.

Figure 2:
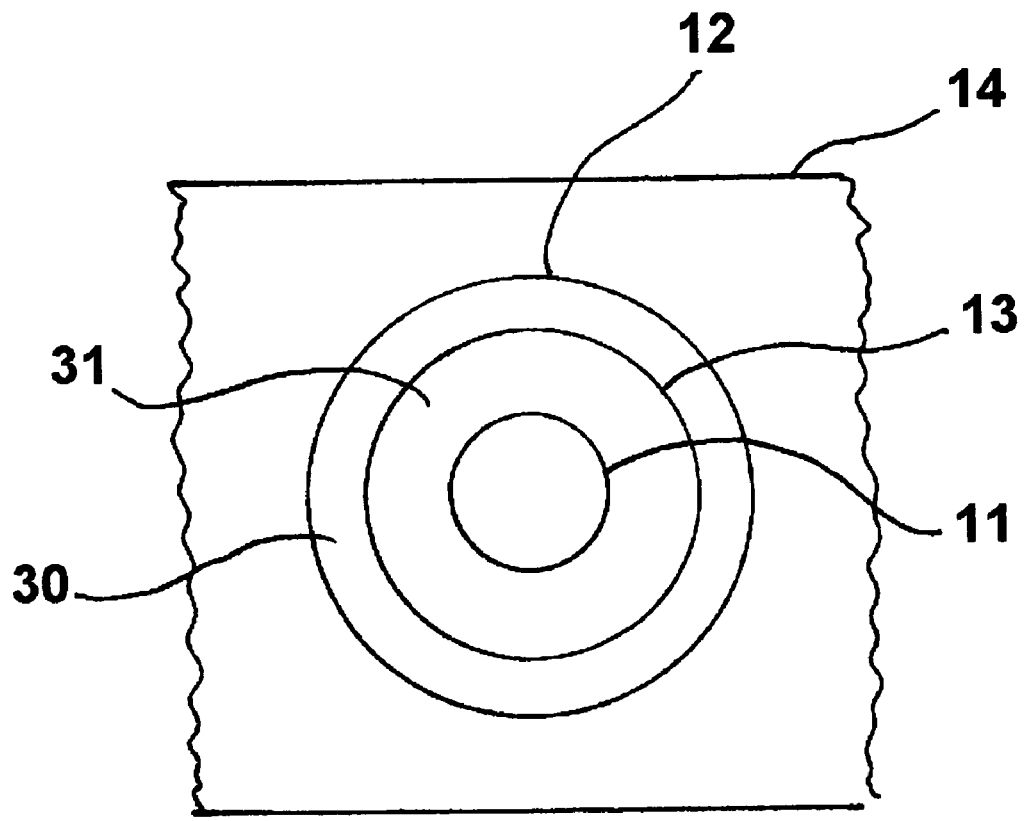
FIG. 2 is a view of the direct flame impingement burner shown in FIG. 1 taken along the line II-II.

A single internally recuperated DFI system burner 10 in accordance with one embodiment of this invention, disposed in an opening formed by refractory block 14, as shown in FIG. 1, comprises an innermost coaxial conduit 11 having a first fluid inlet end 16, which is in fluid communication with a first fluid source (not shown), and a first fluid outlet end 19, an outermost coaxial conduit 12 having an outside diameter substantially corresponding to the diameter of the opening formed by refractory block 14 disposed around the innermost conduit 19 and having a combustion products outlet end 18 proximate the first fluid inlet end 16 of the innermost conduit 19 and a combustion products inlet end 21 disposed proximate the first fluid outlet end 19 of innermost coaxial conduit 11, and at least one coaxial intermediate conduit 13 disposed between the innermost coaxial conduit 11 and the outermost coaxial conduit 12, whereby a second fluid annular region 31, as shown in FIG. 2, is formed between the innermost coaxial conduit 11 and the intermediate coaxial conduit 13 and a combustion products annular region 30 is formed between the intermediate coaxial conduit 13 and the outermost coaxial conduit 12. Intermediate conduit 13 comprises a second fluid inlet end 17, which is in fluid communication with a second fluid supply (not shown), proximate the first fluid inlet end 16 of innermost conduit 11 and a second fluid outlet end 20 proximate the combustion products inlet end 21 of outermost conduit 12.

As shown in FIG. 1, the first fluid outlet end 19 of innermost conduit 11 is recessed within intermediate conduit 13 at a distance from second fluid outlet end 20 of intermediate conduit 13. In accordance with one particularly preferred embodiment of this invention, first fluid outlet end 19 of innermost conduit 11 is substantially flush with second fluid outlet end 20 of intermediate conduit 13. Innermost conduit 11 forms a plurality of first fluid outlet openings, represented by arrows 23, proximate first fluid outlet end 19 through which first fluid introduced into innermost conduit 11 at first fluid inlet end 16 is passed into the second fluid annular region 31 where it mixes with second fluid flowing through second fluid annular region 31, forming a first/second fluid mixture. In accordance with one particularly preferred embodiment of this invention, the first fluid is a fuel gas, the second fluid is a combustion oxidant, and the mixture is a fuel/oxidant mixture. The fuel/oxidant mixture, with an equivalency ratio in the range of about 0.5 to about 3.0, more preferably in the range of about 0.99 to 0.93 and most preferred in the range of about 0.99 to 0.97, which comprises preheated combustion oxidant and which is discharged at a high velocity (about Mach 0.5 to about Mach 1.5) from the burner, is then ignited to form a flame, represented by arrows 24, which flame impinges upon the ferrous or non-ferrous product 15, thereby releasing heat at and to the surface of and into the product 15. Upon heat release by the fuel/oxidant mixture to the surface of the product, the now cooled products of combustion, typically at a temperature of less than about 2800° F., are pass into combustion products annular region 30, either by way of pressure within the heating furnace or by drawing means, such as a pump or fan 28, thereby flowing in a counterflow relationship to the combustion oxidant flowing through second fluid annular region 31 and, by way of an enhanced heat transfer surface, preheating the incoming combustion oxidant. The further cooled products of combustion may then be exhausted through combustion products outlet end 18 of the outermost conduit 12. In accordance with one preferred embodiment, the combustion chamber facing surface of refractory 14 has a shape substantially corresponding to the shape of the product being heated.

Figure 3:
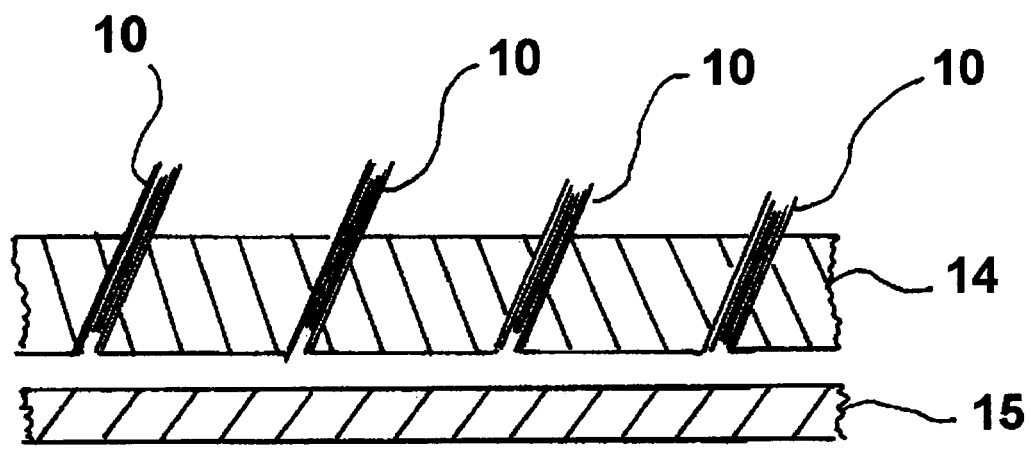
FIG. 3 is a schematic cross-sectional lateral view of a portion of a direct flame impingement system in accordance with one embodiment of this invention.

FIG. 3 shows an exemplary embodiment of a portion of a heating furnace having a plurality of DFI system burners 10 in accordance with this invention, which burners produce flames that impinge upon the product 15 at an impingement angle in the range of about 60° to about 120°.

Figure 4:
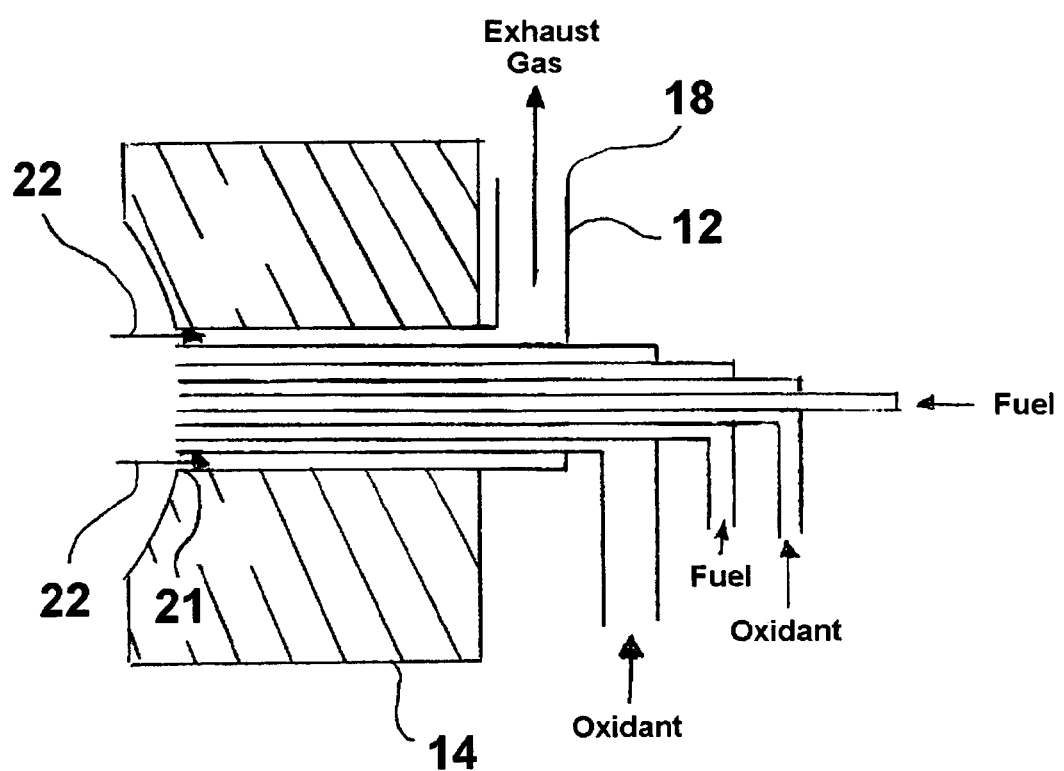
FIG. 4 is a schematic partial cross-sectional view of a single internally recuperated direct flame impingement burner in accordance with one embodiment of this invention.
Figure 5:
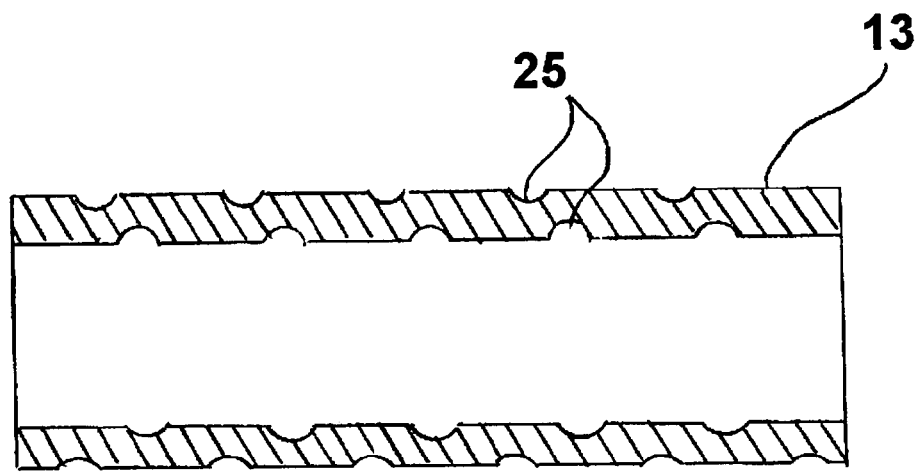
FIG. 5 is a cross-sectional view of a burner conduit having dimpled surfaces in accordance with one embodiment of this invention.

FIG. 4 shows a burner in accordance with one embodiment of this invention comprising a plurality of intermediate coaxial conduits. Each coaxial conduit of the burner may be employed for delivering a fuel gas and/or combustion oxidant to the combustion chamber. In accordance with one preferred embodiment of this invention, heat transfer between the combustion products and the combustion oxidant and/or fuel gas is enhanced by the use of heat transfer enhancements such as the use of fins 26 connected to a surface of intermediate conduit as shown, for example, in FIG. 1. FIG. 5 shows a fluid conduit 13 in which heat transfer is enhanced by dimples 25 formed by at least one surface of the conduit.

By way of comparative example, conventional billet heating furnaces in the steel industry typically use from 50 to over 100 burners that fire into combustion chambers, constituting from three to six zones in the furnace. These burners radiate energy to the product and to the furnace refractory, which re-radiates energy to the product. This approach requires a furnace with a large footprint and combustion chamber volume, which results in high first costs and high maintenance costs. Additionally, the combustion products typically exit the furnace at temperatures in the range of about 1800° F. to about 2000° F. before entering into a common recuperator that preheats the combustion air. $NO_x$ emissions typically range from about 150 ppmv to about 250 ppmv. The mode of burner operation is modulating, which results in equivalency ratios in the range of about 0.95 to about 0.8, which tends to reduce furnace efficiency and exposes the product to scale losses.

In contrast thereto, a direct flame impingement heating furnace in accordance with this invention employs zones of predetermined positioned DFI burners that effectively wrap around the product, thereby ensuring a high, uniform and efficient rate of heat transfer. Because combustion is localized at each burner and each burner is self-recuperated, with a small range of equivalency ratios, typically 0.99 to 0.97, where 1.0 is the target, the waste-gas losses encountered using conventional heating furnaces are avoided and scale loss is reduced with a consequent reduction in product loss, maintenance work necessary to remove accumulated scale and removal of mill scale from scale-breaking equipment. The immediate transfer of heat from the high velocity flame, due to the proximity of the nozzles to the load, greatly reduces $NO_x$ formation, typically in the range of about 50% to about 75% compared to conventional heating furnaces. And, finally, burner instability due to a cold furnace chamber is eliminated by relying not on the refractory incandescence to maintain ignition, but rather on a design that retains the root of the flame in close proximity to the burner outlet.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method of heating at least one of a removable ferrous workpiece and a removable non-ferrous workpiece comprising the steps of:

providing a heating apparatus comprising at least one refractory wall enclosing a combustion chamber including at least one burner opening having a burner opening outlet end adjacent said combustion chamber and a burner opening inlet end distal from said burner opening outlet end adapted to receive a burner;

providing a burner within said at least one burner opening;

providing at least one of a removable ferrous workpiece and a removable nonferrous workpiece inside said combustion chamber;

introducing one of a fuel gas and a combustion oxidant into a first fluid inlet end of an innermost coaxial conduit of said at least one burner;

introducing the other of said fuel gas and said combustion oxidant into a second fluid inlet end of an annular region formed between said innermost coaxial conduit and an intermediate coaxial conduit disposed around said innermost coaxial conduit, said second fluid inlet end disposed proximate said first fluid inlet end;

passing said one of said fuel gas and said combustion oxidant through at least one first fluid opening formed by said innermost coaxial conduit proximate a first fluid outlet end of said innermost coaxial conduit, said first fluid outlet end being one of flush with said burner opening outlet end and recessed within said at least one burner opening;

mixing said one of said fuel gas and said combustion oxidant with the other of said fuel gas and said combustion oxidant in said intermediate coaxial conduit proximate a second fluid outlet end of said intermediate coaxial conduit, forming a fuel/oxidant mixture, said second fluid outlet end being one of flush with said burner opening outlet end and recessed within said at least one burner opening;

propelling said fuel/oxidant mixture from said at least one burner at a velocity in a range of about Mach 0.5 to about Mach 1.5;

igniting said fuel/oxidant mixture, forming a flame, said flame impinging upon said at least one of said removable ferrous workpiece and said removable non-ferrous workpiece and forming combustion products;

drawing at least a portion of said combustion products into a combustion products inlet end of a combustion products annular region formed between an outermost coaxial conduit disposed around said intermediate conduit, said combustion products inlet end being one of flush with said burner opening outlet end and recessed within said at least one burner opening; and exhausting said combustion products through a combustion products outlet end of said combustion products annular region, whereby said combustion products are drawn through said combustion products annular region, resulting in heating of said one of said fuel gas and said combustion oxidant disposed in said annular region prior to said mixing of said fuel gas and said combustion oxidant.

2. A method in accordance with claim 1, wherein said fuel/oxidant mixture has an equivalency ratio in a range of about 0.5 to about 3.0.

3. A method in accordance with claim 2, wherein said equivalency ratio is in a range of about 0.99 to about 0.93.

4. A method in accordance with claim 1, wherein said innermost coaxial conduit forms a plurality of radial said first fluid openings whereby said one of said fuel gas and said combustion oxidant is propelled radially outward from said innermost coaxial conduit into said annular region for mixing with said other of said fuel gas and said combustion oxidant.

* * * * *